United States Patent
McClain et al.

[11] Patent Number: 6,052,939
[45] Date of Patent: Apr. 25, 2000

[54] FISHERMAN'S PACK

[76] Inventors: Mike G. McClain; Desi Salazar, both of 160 S. Criss St., Chandler, Ariz. 85226

[21] Appl. No.: 09/286,505

[22] Filed: Apr. 6, 1999

[51] Int. Cl.[7] .................................................. A01K 97/00
[52] U.S. Cl. ...................... 43/54.1; 43/21.2; 206/315.11; 62/457.1; 224/920; 224/922
[58] Field of Search .................................. 43/21.2, 54.1; 206/315.11; 224/651, 655, 920, 922; 62/457.1

[56] References Cited

U.S. PATENT DOCUMENTS

| | | | |
|---|---|---|---|
| 3,603,019 | 9/1971 | Smeltzer | 43/21.2 |
| 4,128,170 | 12/1978 | Elliot | 206/315.11 |
| 4,353,182 | 10/1982 | Junkas | 43/54.1 |
| 4,449,378 | 5/1984 | Thorpe | 62/457.1 |
| 4,845,881 | 7/1989 | Ward | 43/21.2 |
| 5,054,228 | 10/1991 | Elkins | 43/21.2 |
| 5,305,544 | 4/1994 | Testa | 43/54.1 |
| 5,331,761 | 7/1994 | Kuthy | 43/21.2 |
| 5,409,291 | 4/1995 | Lamb | 297/129 |
| 5,462,213 | 10/1995 | Watt | 62/457.1 |
| 5,471,779 | 12/1995 | Downey | 43/54.1 |
| 5,634,291 | 6/1997 | Pham | 43/57 |
| 5,752,340 | 5/1998 | Fleener | 43/21.2 |
| 5,755,057 | 5/1998 | Dancer | 43/54.1 |
| 5,802,760 | 9/1998 | Campbell | 43/57 |
| 5,864,981 | 2/1999 | Zeman | 43/54.1 |
| 5,873,192 | 2/1999 | Chiu | 43/54.1 |
| 5,975,393 | 11/1999 | Bellamy | 224/655 |

*Primary Examiner*—Kurt Rowan
*Attorney, Agent, or Firm*—Joseph N. Breaux

[57] ABSTRACT

A fisherman's pack for providing a fisherman with a cooler, a seat, a tackle box and a number of other fishing accessories within a portable easily transported assembly.

1 Claim, 2 Drawing Sheets

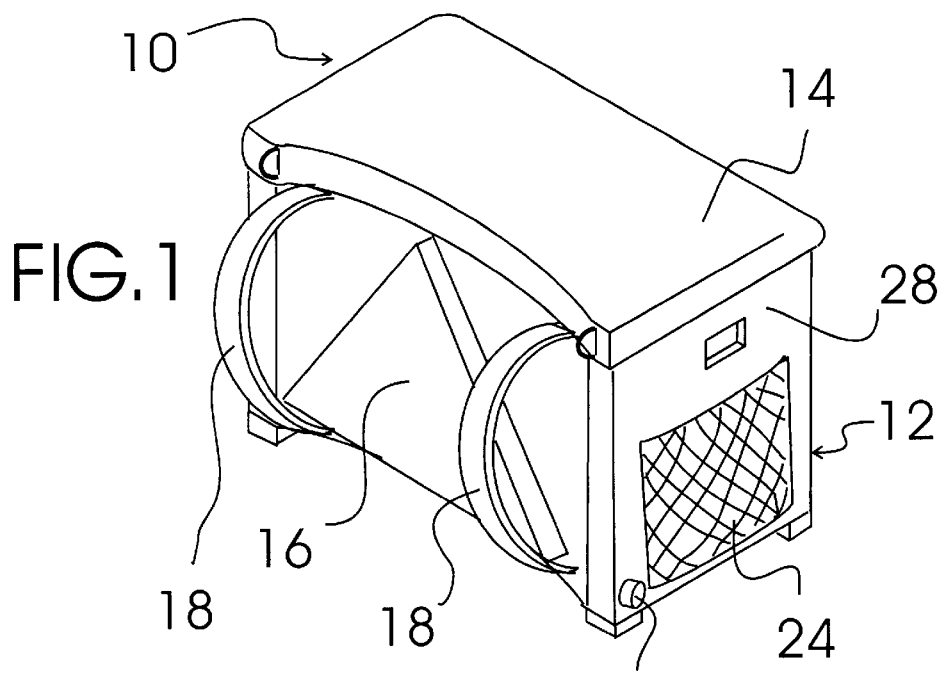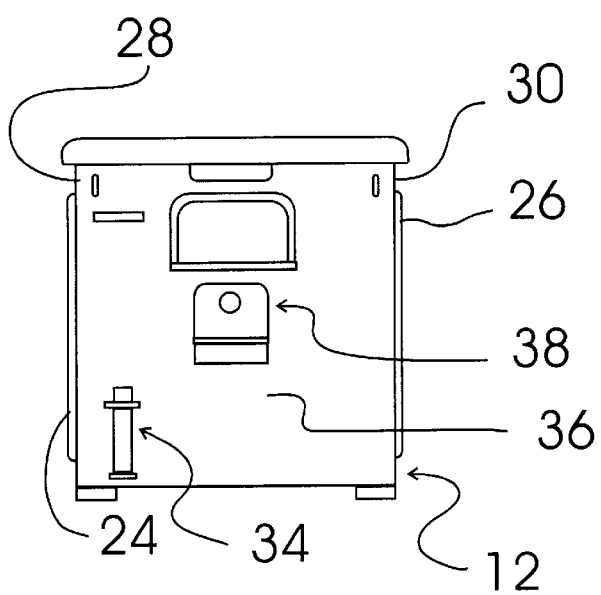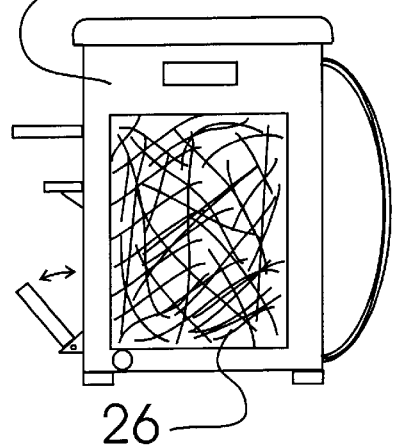

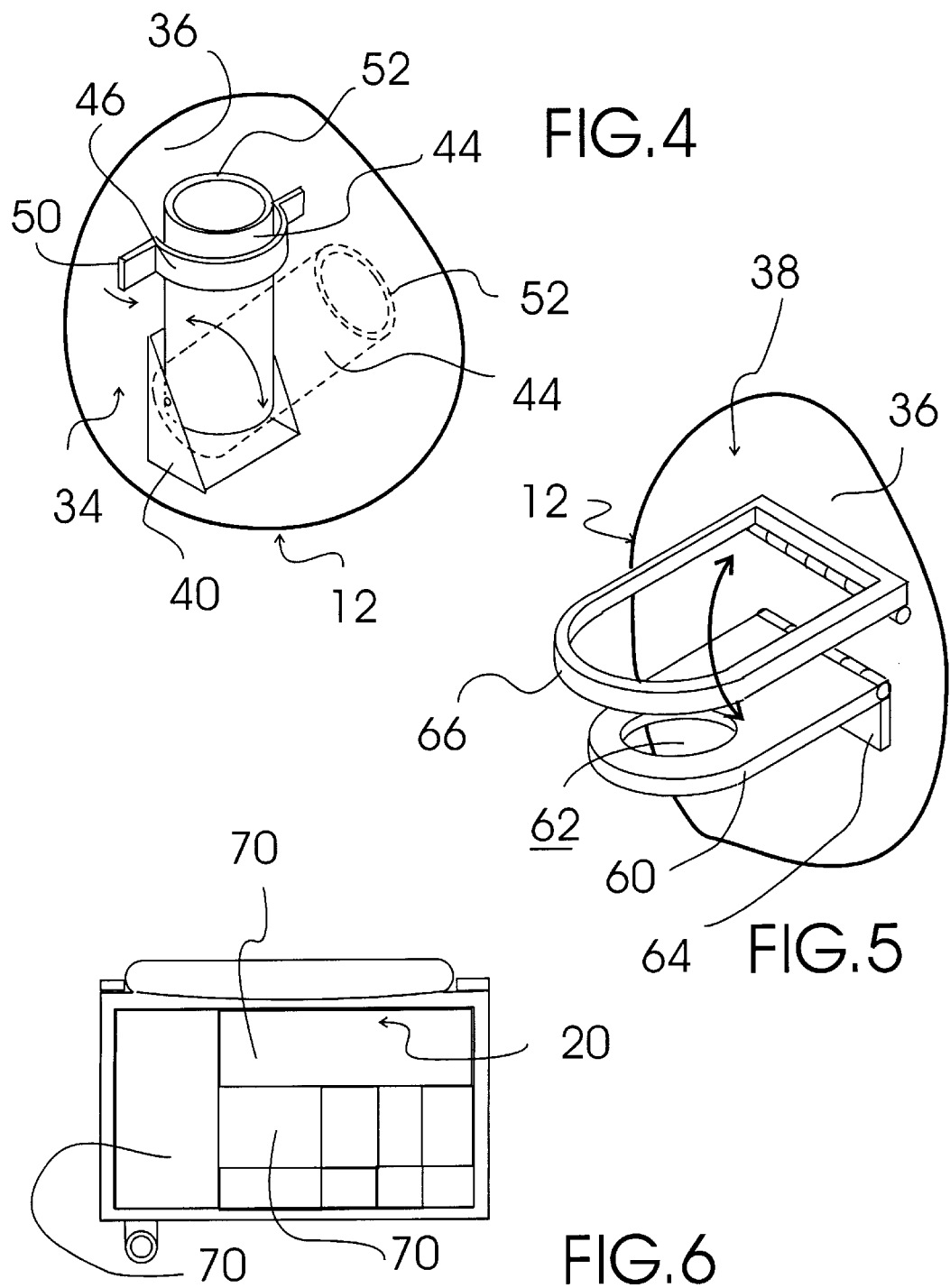

FISHERMAN'S PACK

TECHNICAL FIELD

The present invention relates to fishing accessories and more particularly to a fisherman's pack that includes a rigid insulated pack housing including a removable padded top, a removable back cushion, a pair of shoulder straps, an interior compartment, and a drain spigot in connection between the interior compartment and the exterior of the pack housing; left and right expandable mesh pockets attached to the exterior left and right sides of the pack housing; a pivoting rod holder assembly attached to the exterior front of the pack housing including a wedge shaped pivot stop, a pivotally connected rod handle holding tube, and hook and loop fastener holding tube retaining strap; and a fold out drink cup holder assembly attached to the front exterior surface of the pack housing including a pivoting container bottom support having a drain aperture formed through the center thereof, a wedge shaped bottom support stop, and a U-shaped pivoting container side enclosure pivotally mounted above the pivoting container bottom support; the interior compartment of the pack housing being divided into a number of storage compartments and accessible by removal of the detachable padded top.

BACKGROUND ART

Prime fishing locations can often be some distance from the nearest available vehicle parking facilities. It would be a benefit, therefore, to have a pack that included a number of items typically desired by a fisherman in one compact easily transported assembly to allow the fisherman to transport the items to the fishing location with a minimum amount of aggravation and discomfort.

GENERAL SUMMARY DISCUSSION OF INVENTION

It is thus an object of the invention to provide a fisherman's pack that includes a rigid insulated pack housing including a removable padded top, a removable back cushion, a pair of shoulder straps, an interior compartment, and a drain spigot in connection between the interior compartment and the exterior of the pack housing; left and right expandable mesh pockets attached to the exterior left and right sides of the pack housing; a pivoting rod holder assembly attached to the exterior front of the pack housing including a wedge shaped pivot stop, a pivotally connected rod handle holding tube, and hook and loop fastener holding tube retaining strap; and a fold out drink cup holder assembly attached to the front exterior surface of the pack housing including a pivoting container bottom support having a drain aperture formed through the center thereof, a wedge shaped bottom support stop, and a U-shaped pivoting container side enclosure pivotally mounted above the pivoting container bottom support; the interior compartment of the pack housing being divided into a number of storage compartments and accessible by removal of the detachable padded top.

Accordingly, a fisherman's pack is provided. The fisherman's pack includes a rigid insulated pack housing including a removable padded top, a removable back cushion, a pair of shoulder straps, an interior compartment, and a drain spigot in connection between the interior compartment and the exterior of the pack housing; left and right expandable mesh pockets attached to the exterior left and right sides of the pack housing; a pivoting rod holder assembly attached to the exterior front of the pack housing including a wedge shaped pivot stop, a pivotally connected rod handle holding tube, and hook and loop fastener holding tube retaining strap; and a fold out drink cup holder assembly attached to the front exterior surface of the pack housing including a pivoting container bottom support having a drain aperture formed through the center thereof, a wedge shaped bottom support stop, and a U-shaped pivoting container side enclosure pivotally mounted above the pivoting container bottom support; the interior compartment of the pack housing being divided into a number of storage compartments and accessible by removal of the detachable padded top.

BRIEF DESCRIPTION OF DRAWINGS

For a further understanding of the nature and objects of the present invention, reference should be made to the following detailed description, taken in conjunction with the accompanying drawings, in which like elements are given the same or analogous reference numbers and wherein:

FIG. 1 is a perspective view of an exemplary embodiment of the fisherman's pack of the present invention showing the rigid insulated pack housing including a removable padded top, a removable back cushion, a pair of shoulder straps, an interior compartment, and a drain spigot in connection between the interior compartment and the exterior of the pack housing; left and right expandable mesh pockets attached to the exterior left and right sides of the pack housing; a pivoting rod holder assembly attached to the exterior front of the pack housing including a wedge shaped pivot stop, a pivotally connected rod handle holding tube, and hook and loop fastener holding tube retaining strap; and a fold out drink cup holder assembly attached to the front exterior surface of the pack housing including a pivoting container bottom support having a drain aperture formed through the center thereof, a wedge shaped bottom support stop, and a U-shaped pivoting container side enclosure pivotally mounted above the pivoting container bottom support; the interior compartment of the pack housing being divided into a number of storage compartments and accessible by removal of the detachable padded top.

FIG. 2 is a front plan view of the fisherman's pack of FIG. 1 showing left and right expandable mesh pockets attached to the exterior Left and right sides of the pack housing; a pivoting rod holder assembly attached to the exterior front of the pack housing including a wedge shaped pivot stop, a pivotally connected rod handle holding tube, and hook and loop fastener holding tube retaining strap; and a fold out drink cup holder assembly attached to the front exterior surface of the pack housing including a pivoting container bottom support having a drain aperture formed through the center thereof, a wedge shaped bottom support stop, and a U-shaped pivoting container side enclosure pivotally mounted above the pivoting container bottom support.

FIG. 3 is a left side plan view of the fisherman's pack of FIG. 1 showing the left expandable mesh pocket attached to the exterior left side of the pack housing; the pivotally connected rod handle holding tube in the fully outwardly pivoted position with the hook and loop fastener holding tube retaining strap released; and the pivoting container bottom support and the U-shaped pivoting container side enclosure pivoted out at a ninety degree angle with respect to the exterior front surface of the pack housing.

FIG. 4 is a detail perspective view showing the pivoting rod holder assembly in the storage position in unbroken lines and the fully outwardly pivoted position in dashed lines.

FIG. 5 is a detail perspective view of the fold out drink cup holder assembly with the pivoting container bottom support fully pivoted and supported by the wedge shaped bottom support stop, and the U-shaped pivoting container side enclosure pivotally mounted above the pivoting container bottom support.

FIG. 6 is a top plan view of the pack housing with the detachable padded top removed to show the interior compartment of the pack housing divided into a number of storage compartments.

EXEMPLARY MODE FOR CARRYING OUT THE INVENTION

FIG. 1 shows an exemplary embodiment of the fisherman's pack of the present invention generally designated 10. Fisherman's pack 10 includes a rigid, molded, insulated foam pack housing, generally designated 12 including a removable padded top 14, a removable back cushion 16, a pair of shoulder straps 18, an interior compartment, generally designated 20 (FIG. 6) and a drain spigot 22 in connection between interior compartment 20 (FIG. 6) and the exterior of pack housing 12; referring now to FIG. 2, left and right expandable mesh pockets 24,26 attached to the exterior left and right sides 28,30 (see also FIGS. 1 and 3) of pack housing 12; a pivoting rod holder assembly, generally designated 34, attached to exterior front 36 of pack housing 12 and a fold out drink cup holder assembly, generally designated 28, attached to front exterior surface 36 of pack housing 12.

Referring to FIG. 4, pivoting rod holder assembly 34 includes a wedge shaped pivot stop 40 permanently secured to front exterior surface 36 of pack housing 12, a plastic rod handle holding tube, 44 pivotally connected to pivot stop 40, and a hook and loop fastener holding tube retaining strap 46. Holding tube retaining strap 46 holds rod handle holding tube 44 in a storage position positioned against front exterior surface 36. In use, holding tube retaining strap 46 is detached at a first end 50 to allow the top 52 of rod handle holding tube 44 to pivot away from surface 36 to about a forty-five degree angle where it is prevented from further rotation and supported by a forty-five degree angled stop surface 58 of pivot stop 40.

With reference to FIG. 5, fold out drink cup holder assembly 38 includes a pivoting container bottom support 60 having a drain aperture 62 formed through the center thereof, a wedge shaped bottom support stop 64 attached to front exterior surface 36 of pack housing 12, and a U-shaped pivoting container side enclosure 66 pivotally mounted above pivoting container bottom support 60. In use pivoting container bottom support 60 is pivoted away from exterior surface 36 and held at about a ninety degree angle with respect to exterior surface 36 by wedge shaped bottom support stop 64. U-shaped pivoting container side enclosure 66 pivots freely to hold a container supported on container bottom support 60 against the side of exterior surface 36.

With reference to FIG. 6, interior compartment 20 is accessible by removing detachable padded top 14 (FIG. 1) and is partitioned into a number of storage compartments 70 for storing items such as ice for keeping beverages and food cold as well as preserving fish, a tackle tray, and a food tray for keeping food items not suitably stored in direct contact with ice. Other items such as insect repellant and the like are stored in expandable mesh pockets 24,26 (FIGS. 1,2 and 3).

It can be seen from the preceding description that a fisherman's pack has been provided that includes a rigid insulated pack housing including a removable padded top, a removable back cushion, a pair of shoulder straps, an interior compartment, and a drain spigot in connection between the interior compartment and the exterior of the pack housing; left and right expandable mesh pockets attached to the exterior left and right sides of the pack housing; a pivoting rod holder assembly attached to the exterior front of the pack housing including a wedge shaped pivot stop, a pivotally connected rod handle holding tube, and hook and loop fastener holding tube retaining strap; and a fold out drink cup holder assembly attached to the front exterior surface of the pack housing including a pivoting container bottom support having a drain aperture formed through the center thereof, a wedge shaped bottom support stop, and a U-shaped pivoting container side enclosure pivotally mounted above the pivoting container bottom support; the interior compartment of the pack housing being divided into a number of storage compartments and accessible by removal of the detachable padded top.

It is noted that the embodiment of the fisherman's pack described herein in detail for exemplary purposes is of course subject to many different variations in structure, design, application and methodology. Because many varying and different embodiments may be made within the scope of the inventive concept(s) herein taught, and because many modifications may be made in the embodiment herein detailed in accordance with the descriptive requirements of the law, it is to be understood that the details herein are to be interpreted as illustrative and not in a limiting sense.

What is claimed is:

1. A fisherman's pack comprising:

a rigid insulated pack housing including a removable padded top, a removable back cushion, a pair of shoulder straps, an interior compartment, and an exterior surface, and a drain spigot in connection between said interior compartment and said exterior of said pack housing;

left and right expandable mesh pockets attached to said exterior surface on left and right sides of said pack housing;

a pivoting rod holder assembly attached to said exterior surface of said pack housing including a wedge shaped pivot stop, a pivotally connected rod handle holding tube, and hook and loop fastener holding tube retaining strap; and a fold out drink cup holder assembly attached to said exterior surface of said pack housing including a pivoting container bottom support having a drain aperture formed through said center thereof, a wedge shaped bottom support stop, and a U-shaped pivoting container side enclosure pivotally mounted above said pivoting container bottom support;

said interior compartment of said pack housing being divided into a number of storage compartments and accessible by removal of said removable padded top.

* * * * *